United States Patent
Heinz et al.

(10) Patent No.: US 9,362,862 B2
(45) Date of Patent: Jun. 7, 2016

(54) METHOD AND CIRCUIT ARRANGEMENT FOR LIMITING PEAK CURRENTS AND THE SLOPE OF THE CURRENT EDGES

(71) Applicant: Continental Teves AG & Co. OHG, Frankfurt (DE)

(72) Inventors: Micha Heinz, Darmstadt (DE); Frank Michel, Rosbach v.d. Höhe (DE)

(73) Assignee: Continental Teves AG & Co. oHG (DE)

( * ) Notice: Subject to any disclaimer, the term of this patent is extended or adjusted under 35 U.S.C. 154(b) by 16 days.

(21) Appl. No.: 14/381,748

(22) PCT Filed: Mar. 5, 2013

(86) PCT No.: PCT/EP2013/054385
§ 371 (c)(1),
(2) Date: Aug. 28, 2014

(87) PCT Pub. No.: WO2013/131905
PCT Pub. Date: Sep. 12, 2013

(65) Prior Publication Data
US 2015/0054430 A1    Feb. 26, 2015

(30) Foreign Application Priority Data

Mar. 7, 2012  (DE) .......................... 10 2012 203 558
Aug. 6, 2012  (DE) .......................... 10 2012 213 874

(51) Int. Cl.
*H02P 3/00* (2006.01)
*H02K 7/10* (2006.01)
(Continued)

(52) U.S. Cl.
CPC ................. *H02P 29/02* (2013.01); *B60T 8/404* (2013.01); *B60T 8/405* (2013.01); *B60T 13/662* (2013.01)

(58) Field of Classification Search
CPC ..... B60T 8/4059; B60T 8/405; B60T 13/662; B60T 17/02; B60T 17/22; B60T 8/4022; B60T 8/4036; B60T 8/36; B60T 8/4872; H02P 6/18; H02P 6/001; H02P 6/14; H02P 6/142; H02P 2201/03; H02P 2205/01
USPC ..................... 318/360–362, 400.14, 400.31; 701/34.4, 23, 48–50; 62/498
See application file for complete search history.

(56) References Cited

U.S. PATENT DOCUMENTS 5,784,716 A * 7/1998 Holt ..................... A63B 21/065
2/69

(Continued)

FOREIGN PATENT DOCUMENTS

DE        10232704        3/2003
DE        10246382        4/2003
(Continued)

OTHER PUBLICATIONS

German Search Report mailed Nov. 22, 2013 in counterpart German Application No. 10 2012 213 874.9, including partial translation.
(Continued)

*Primary Examiner* — Paul Ip
(74) *Attorney, Agent, or Firm* — RatnerPrestia

(57) ABSTRACT

A method for limiting peak currents, particularly depending on a charge quantity provided by a voltage source, and the maximum pitch of the current flanks of an electric motor for an electrohydraulic motor vehicle brake system, particularly a pump motor, controlled by pulse width modulation, wherein a change to an actual duty cycle of the PWM is made by a first duty cycle of the PWM on a second duty cycle at runtime, wherein the change takes place according to a positive or negative pitch value calculated and/or changeable at runtime. The invention further describes an electronic circuit arrangement for the implementation of a method for limiting peak currents and the maximum pitch of current flanks.

15 Claims, 2 Drawing Sheets

(51) Int. Cl.
   *H02P 29/02* (2016.01)
   *B60T 8/40* (2006.01)
   *B60T 13/66* (2006.01)

(56) References Cited

U.S. PATENT DOCUMENTS

| | | | |
|---|---|---|---|
| 6,034,493 A * | 3/2000 | Boyd | H02P 6/002 318/400.31 |
| 6,299,260 B1 | 10/2001 | Hachtel | |
| 6,594,567 B2 | 7/2003 | Zhou | |
| 6,659,568 B2 * | 12/2003 | Wandel | B60T 8/4036 303/11 |
| 6,982,534 B2 | 1/2006 | Hahn | |
| 7,323,838 B2 | 1/2008 | Ma | |
| 7,340,158 B2 * | 3/2008 | Zeh | H02M 7/53875 388/800 |
| 7,725,223 B2 * | 5/2010 | Gordon | A47L 5/28 700/245 |
| 8,527,176 B2 * | 9/2013 | Zimmermann | B60T 8/4022 188/137 |
| 8,541,991 B2 * | 9/2013 | Lopata | H02M 3/1588 323/224 |
| 8,686,698 B2 * | 4/2014 | Lopata | H02M 3/1588 323/224 |
| 2003/0080611 A1 * | 5/2003 | Wandel | B60T 8/4036 303/10 |
| 2003/0102746 A1 * | 6/2003 | Taira | F16C 32/0442 310/90.5 |
| 2006/0177204 A1 * | 8/2006 | Zeh | H02M 7/53875 388/804 |
| 2007/0061058 A1 * | 3/2007 | Gordon | A47L 5/28 701/23 |
| 2009/0001807 A1 * | 1/2009 | Nomura | B60T 8/36 303/20 |
| 2011/0219816 A1 * | 9/2011 | Tanaka | H02P 6/142 62/498 |
| 2012/0005840 A1 * | 1/2012 | Jang | D06F 33/02 8/137 |
| 2013/0158783 A1 * | 6/2013 | Zimmermann | B60T 8/4022 701/34.4 |

FOREIGN PATENT DOCUMENTS

| | | |
|---|---|---|
| DE | 10232166 | 2/2004 |
| DE | 102006006149 | 9/2006 |
| DE | 102006031402 | 1/2007 |
| EP | 1040975 | 10/2000 |
| EP | 1715574 | 10/2006 |
| WO | 2010060671 | 6/2010 |

OTHER PUBLICATIONS

International Search Report for PCT/EP2013/054385 mailed Sep. 13, 2013.
Written Opinion of the International Searching Authority for International Application No. PCT/EP2013/504385, including an English Translation.

* cited by examiner

METHOD AND CIRCUIT ARRANGEMENT FOR LIMITING PEAK CURRENTS AND THE SLOPE OF THE CURRENT EDGES

CROSS REFERENCE TO RELATED APPLICATIONS

This application is the U.S. National Stage Application of PCT International Application No. PCT/EP2013/054385, filed Mar. 5, 2013, which claims priority to German Patent Application No. 10 2012 203 558.3, filed Mar. 7, 2012 and German patent Application No. 10 2012 213 874.9, filed Aug. 6, 2012, the contents of such applications being incorporated by reference herein.

FIELD OF THE INVENTION

The present invention relates to a method for limiting peak currents and also the maximum slope of the current edges and also to a circuit arrangement.

BACKGROUND OF THE INVENTION

In order to prevent malfunctions in the increasing number of electronic components or in the power supply in the vehicle and related safety or comfort restrictions for the vehicle occupant, the demands on electrical components to keep the power draw from the vehicle onboard power supply system within defined limits are increasing. This applies particularly to electric motors in a motor vehicle brake installation, the high starting currents of which can result in severe loading of the entire vehicle onboard power supply system and in an intermittent drop in the supply voltage. This can in turn affect the functionality of other vehicle components and hence restrict safety and comfort for the vehicle occupants.

In this regard, DE 10 2006 006 149 A1, which is incorporated by reference, describes a method for actuating a displacement machine in a brake installation, which method has provision for a special starting method in order to avoid current spikes when the PWM-actuated drive of the displacement machine is started. To this end, a higher PWM frequency is used in the starting or primary phase than in what is known as the secondary phase, after the drive has started. Since the current spikes take place in a very short time range, the higher PWM frequency of the primary phase achieves improved tracking of the duty cycle, which achieves a reduction in these current spikes. In addition, the duty cycle is increased gradually in prescribed steps within the primary phase up to the maximum value of continuous actuation (duty cycle corresponds to 100%) in order to start the secondary phase subsequently. In addition, the special starting method can be activated, deactivated or modified on the basis of the vehicle travel state.

Systems according to the prior art no longer meet the present demands on the limitation of peak currents, particularly on the basis of the charge quantity provided by the voltage source and also the maximum slope of the current edges. It is not possible for the PWM actuation frequency to be increased arbitrarily, since the high computation workload of the microcontroller means that alteration of the duty cycle by the control software results in almost no further functions being able to be performed during this time. This clashes with a growing number of brake assistance functions, which make increasing use of resources. In addition, it is not possible to communicate with the hardware logic of the electric motor actuation at arbitrary speed. The communication interface, for example SPI, between the microcontroller on which the control software is implemented and the actuating hardware of the electric motor is a limiting factor for existing systems.

If, by way of example, commands from the software for changing the duty cycle are sent in the 1 ms pattern—even just 10 ms are usual at present—this is insufficient, when the electric motor is switched on, for limiting the peak currents and current edges in order to meet the present demands for avoiding malfunctions, since the rising edge of the current takes place in a time range of less than 1 ms. The current edge when the electric motor is switched off can also cause faults in the electronic components in the vehicle that need to be avoided on the basis of the demands.

SUMMARY OF THE INVENTION

Therefore, an aspect of the invention to realize limitation on the basis of the present demands on electrical motor vehicle components in terms of the peak currents, particularly on the basis of the charge quantity provided by a voltage source, and also the maximum slope of the current edges of the electric motor in an electrohydraulic motor vehicle brake system, with restrictions in the brake system functions on account of insufficiently rapid starting of the electric motor needing to be avoided and the cost pressure during the construction of vehicle components needing to be taken into account.

The method for limiting peak currents, particularly on the basis of the charge quantity provided by a voltage source, and also the maximum slope of the current edges of an electric motor, actuated by means of pulse width modulation (PWM), in an electrohydraulic motor vehicle brake system, particularly a pump motor, wherein an actual duty cycle of the PWM is changed from a first duty cycle of the PWM to a second duty cycle at execution time, is distinguished in that the change is made in accordance with a positive or negative slope value that is calculated and/or can be changed at execution time, the change being executed particularly preferably by a hardware logic unit of a hardware module that actuates the electric motor.

The advantage is that the present demands on the limitations can be observed. In comparison with the prior art, there is furthermore a resultant lower workload for the microcontroller on which the control software of the brake system is implemented and also for the communication interface between the microcontroller and the hardware logic unit of the electric motor actuation. In combination with appropriate filter networks, the loading on the vehicle onboard power supply system, brought about particularly by activation or deactivation of the pump, can be significantly reduced in comparison with systems based on the prior art.

According to a further preferred embodiment, the actual duty cycle is changed by using the slope value stored in a first logic register that the hardware module comprises, and the actual duty cycle is approximated to the setpoint duty cycle stored in a second logic register that the hardware module comprises.

Advantageously, this allows an essentially independent change of the PWM duty cycle by the actuating hardware of the electric motor without requiring resources of the microcontroller and of the communication interface.

According to a first preferred embodiment, in order to change the actual duty cycle of the PWM, the actual duty cycle is incremented or decremented by the slope value, with the change being made particularly in each period of the PWM. Preferably, the actual duty cycle in bits is changed on the basis of the bit significance per period of the PWM.

In comparison with the prior art, in which, as described further above, the duty cycle is changed by software every 1 to 10 ms, the invention advantageously allows the duty cycle to be changed on the basis of the PWM frequency in the range of much less than 1 ms and hence in the range of the current rise. The bit-value change advantageously allows incrementation or decrementation to be performed in broad, changeable orders of magnitude.

With particular preference, the setpoint duty cycle and/or the slope value is/are stored in the logic register(s) that the hardware module comprises by a computation program, which is particularly a piece of control software for the motor vehicle brake system.

The control software for the motor vehicle brake system can output the prescribed values advantageously at a lower frequency than is necessary for the changes of the PWM duty cycle in order to meet the demands, since the essential part, namely the possibility of presenting a ramp function, is allowed largely independently by the hardware. This resource saving allows further control tasks to be performed by the microcontroller particularly while the motor is starting.

According to a further preferred embodiment, a first duty cycle threshold value of the PWM is existent that is used only when the PWM is activated and/or deactivated, and that is designed particularly such that the actual duty cycle jumps from 0% to the first duty cycle threshold value when the PWM is activated and/or from the first duty cycle threshold value to 0% when the PWM is deactivated. Preferably, the first duty cycle threshold value is used as a value for the first duty cycle when the PWM is activated and/or as a value for the second duty cycle when the PWM is deactivated.

The advantage is that the time from activation to full power, in particular, and from a given actual duty cycle to deactivation can additionally be adjusted (speeded up) if the slope value is regarded as given. The calculation is advantageously performed by taking account of the specified demands for power draw from the vehicle onboard power supply system.

With particular preference, the change in the actual duty cycle can be activated or deactivated in accordance with the slope value at execution time.

The advantage is that at functional fallback levels of the motor vehicle brake system or in emergency situations, for example, the maximum power of the electric motor is available without delay.

Preferably, a second duty cycle threshold value of the PWM is existent that is designed particularly such that actual duty cycles between this second duty cycle threshold value and continuous actuation are skipped when the actual duty cycle is changed. In addition, the first duty cycle threshold value and/or the second duty cycle threshold value are particularly preferably stipulated on the basis of the PWM frequency, it being possible for the first duty cycle threshold value and/or the second duty cycle threshold value to be changed at execution time.

In addition, preferably, a minimum value is defined for the actual duty cycle, said minimum value being stipulated particularly on the basis of the PWM frequency and being less than or equal to the first duty cycle threshold value.

According to a further preferred embodiment of the inventive method, the first duty cycle threshold value and/or the second duty cycle threshold value is/are stored in at least one logic register and used for the provision of the actual duty cycle by the hardware logic unit.

The electronic circuit arrangement for performing the method described further above, wherein data are interchanged with a computation means that executes a computation program, preferably a microcontroller, via a data transmission means, particularly an SPI bus system, with a hardware module that actuates an electric motor in a motor vehicle brake system, particularly a pump motor, wherein this hardware module comprises at least one hardware logic unit and at least one logic register, is distinguished in that at least one logic register that stores a slope value of the duty cycle and/or a first duty cycle threshold value and/or a setpoint duty cycle of the PWM, and also a hardware logic unit that determines an actual duty cycle by using the values in the logic register(s), is existent.

BRIEF DESCRIPTION OF THE DRAWINGS

Further preferred embodiments can be found in the subclaims and the description below of an exemplary embodiment with reference to figures, in which:

DETAILED DESCRIPTION OF THE PREFERRED EMBODIMENTS

Figure 1:
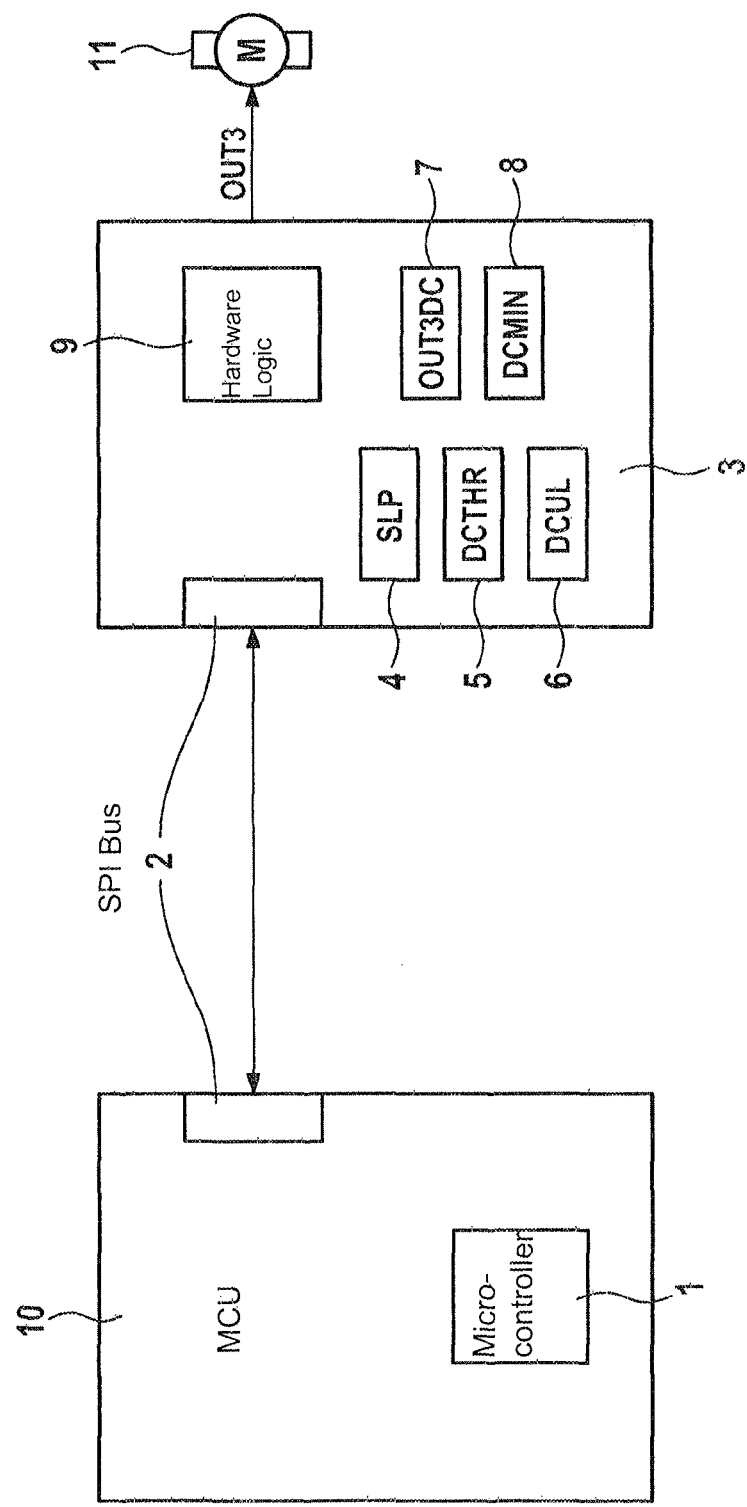
FIG. 1 shows a schematic diagram of the inventive, electronic circuit arrangement.

FIG. 1 shows a schematic diagram of the inventive electronic circuit arrangement, wherein the microcontroller unit (MCU) 10 and the hardware module (PCU) 3 communicate via the SPI bus system 2. The MCU 10 comprises the microcontroller 1, which executes calculations for the brake control system. The SPI bus system 2 is used to store the values calculated in this manner, the setpoint duty cycle OUT3DC, the slope value SLP, the first duty cycle threshold value DCTHR, the second duty cycle threshold value DCUL and the minimum value of the duty cycle DCMIN, in the logic registers 4 to 8 of the PCU 3. The PCU 3 performs the actuation for the electric motor 11 by means of the hardware logic unit 9, which accesses the logic registers 4 to 8. The electric motor is actuated in a manner that is known per se by means of the field effect transistor, the gate of which is in turn actuated by the hardware logic unit 9, this not being shown explicitly.

The circuit arrangement shown in FIG. 1 shows a preferred embodiment of the invention. It is therefore likewise possible for the microcontroller 1 to be accommodated in the PCU 3 according to an alternatively preferred embodiment.

Figure 2:
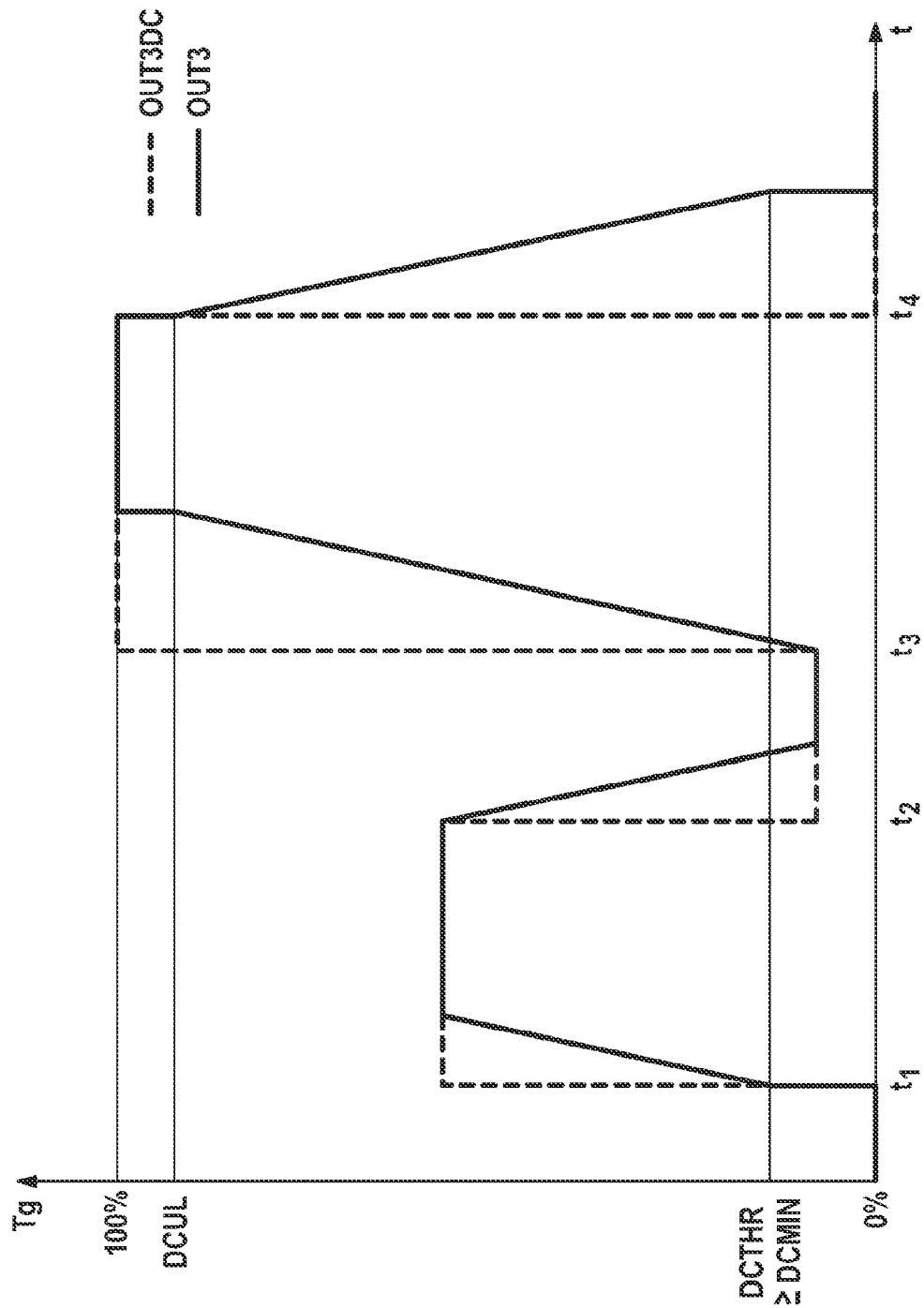
FIG. 2 shows exemplary, inventive PWM actuation for a pump motor with slope values for the PWM duty cycle.

FIG. 2 shows exemplary PWM actuation of a pump motor of an electromechanical brake system for which the inventive method for limiting peak currents and the maximum slope of the current edges is used. It depicts the time profile of the actual duty cycle OUT3 and the setpoint duty cycle OUT3DC of the PWM actuation shown in FIG. 1. The abscissa plots time t and the ordinate plots duty cycle Tg, with 0% signifying deactivation and 100% signifying a continuous mode of operation of the electric motor for the pump.

Calculations for the control software of the motor vehicle brake system are performed by the microcontroller 1 in the MCU 10. As described in the description relating to FIG. 1, the calculated values are sent to the hardware module 3 via the SPI bus system 2 and are stored in the logic registers 4 to 8. If the pump needs to be activated at the instant t1 as stipulated by the brake control, the hardware logic unit 9 uses these values to actuate the electric motor. In this case, the setpoint duty cycle OUT3DC in the logic register 7 is approximated in a ramp shape by the actual duty cycle OUT3 by using the slope value SLP in the logic register 4 and by taking account of the threshold value DCTHR in the logic register 5. This partitioning of the control task into a software part and a hardware part allows resources of the microprocessor and the SPI bus system to be saved, with the situation-dependent decision by the control software and the actuating section regarding how the pump needs to be actuated itself being taken largely independently by the hardware logic unit. If a PWM frequency of 18 kHz is assumed, this allows the actual duty cycle Out3 to be changed in line with the clock period every 55 μs.

Following the activation, there is a jump from the actual duty cycle OUT3 to the threshold value DCTHR, from which the actual duty cycle OUT3 is increased in a ramp shape to the setpoint duty cycle OUT3DC in line with the slope value SLP. The threshold value DCTHR becomes effective only upon activation and deactivation, and it is additionally possible to prescribe the minimum value DCMIN in the logic register 8, said minimum value being less than or equal to the threshold value DCTHR and being taken into account over the entire activation period of the PWM. The prescribing of the minimum value DCMIN results from overcurrent monitoring in the pump FET.

The range from 0 . . . 100% duty cycle is represented by a value range from 0 . . . 256 bits taking account of the bit significance (LSB), the slope value SLP being expressed as the change of the duty cycle in LSB per period of the PWM.

The control prescribes the calculated values for the setpoint duty cycle Out3DC of 192 LSB, the duty cycle threshold value DCTHR of 64 LSB and the slope value SLP of 2 LSB per PWM period for the activation of the pump, for example, and stores them in appropriate logic registers 4,5,7. The electric motor 11 would accordingly be activated at 25% actual duty cycle OUT3 of the PWM, and the actual duty cycle OUT3 would then be increased in respective increments of 2 to 8 bits of quantization (0 . . . 256 LSB) per PWM period by the hardware logic unit 9, until 75% actuation is reached.

If the slope value SLP is represented by a 10-bit word, for example, selection of the definition allows incrementation and decrementation by fractions of LSB per PWM period, for example by stipulating 4 LSB decimal places and 6 LSB before the decimal point.

Alternatively, the slope value SLP stored in the logic register 4 can be multiplied by a constant or variable factor. If it is multiplied by 1/16 for example, then an LSB of the actual duty cycle OUT3 is incremented or decremented every 16th PWM period.

The logic register 7 is provided with a bit that can be used to switch on or off activation or deactivation of the ramp-shaped soft starting of the electric motor. This allows the maximum available power of the pump to be obtained without delay in particular situations.

If a change (but not deactivation) in the setpoint duty cycle OUT3DC occurs at the instant t2 following initiation by the control, the actual duty cycle OUT3 is decremented in line with the slope value SLP stored in the logic register 4 until the setpoint duty cycle OUT3DC is reached. Between t2 and t3, the actual duty cycle OUT3 is below the threshold value DCTHR that can be ignored during the activation time, but which is nevertheless greater than or equal to the minimum value DCMIN. At the instant t3, continuous pump operation is requested by a change in the setpoint duty cycle OUT3DC to 100%, and the actual duty cycle OUT3 is incremented in a ramp shape on the basis of the slope value SLP. When a duty cycle that corresponds to the second threshold value DCUL in a logic register 6 is reached, there is a jump to 100% actual duty cycle OUT3, at which no further ramp-shaped increase takes place. If the control software prescribes a setpoint duty cycle OUT3DC that is greater than the threshold value DCUL but less than 100%, the actual duty cycle OUT3 is limited to the threshold value DCUL.

If the control initiates the deactivation of the pump from continuous operation at the instant t4, there is first of all a jump from the actual duty cycle Out3 to the threshold value DCUL. Next, the duty cycle is reduced in a ramp shape to the threshold value DCTHR, and from this the PWM is deactivated with a further jump to 0% actual duty cycle OUT3. The threshold value DCUL is also taken into account in the case in which there is no deactivation performed but rather only a change to a lower actual duty cycle OUT3. If, for example during or before the start of the execution time of the PWM, the bit for (de)activating the ramp functionality is changed as appropriate, immediate (de)activation can be effected.

So that time delays for the desired pump power are avoided as far as possible, so as not to obtain any restrictions for the power of the brake system, it is necessary to optimize the slope value with additional consideration of the compliance with the demands with respect to the maximum slope of the current edges and peak current values. The values in the logic registers 4 to 8 can be changed at execution time by the control software, which provides the opportunity to change the slope value SLP, for example, every 5 ms during soft starting or deactivation, so as thereby to produce a rise or fall profile that is in the manner of a polygonal progression. From the conclusion of the write access, the hardware logic unit then uses the new slope value SLP for subsequent actual duty cycles OUT3.

The invention claimed is:

1. A method for limiting peak currents of an electric pump motor in an electrohydraulic motor vehicle brake system, the method including:
   actuating the electric pump motor, by a pump controller applying a pulse width modulation (PWM) voltage signal having a duty cycle, to the electric pump motor, the duty cycle being increased or decreased according to stored data bits indicating a slope value,
   changing, by the pump controller, the duty cycle of the PWM voltage signal based on received data bits indicating another slope value for increasing or decreasing the duty cycle.

2. The method as claimed in claim 1, wherein the change is executed by a hardware logic unit of a hardware module that actuates the electric motor.

3. The method as claimed in claim 1, wherein the actual duty cycle is changed by using the slope value stored in a first logic register that the hardware module comprises, and the actual duty cycle is approximated to the setpoint duty cycle stored in a second logic register that the hardware module comprises.

4. The method as claimed in claim 1, wherein in order to change the actual duty cycle of the PWM, the actual duty cycle is incremented or decremented by the slope value, with the change being made in each period of the PWM.

5. The method as claimed in claim 2, wherein the setpoint duty cycle and/or the slope value is/are stored in the logic register(s) that the hardware module comprises by a computation program, which is a piece of control software for the motor vehicle brake system.

6. The method as claimed in claim 1, wherein a first duty cycle threshold value of the PWM is existent that is used only when the PWM is activated and/or deactivated, and that is designed such that the actual duty cycle jumps from 0% to the first duty cycle threshold value when the PWM is activated and/or from the first duty cycle threshold value to 0% when the PWM is deactivated.

7. The method as claimed in claim 6, wherein the first duty cycle threshold value is used as a value for the first duty cycle when the PWM is activated and/or as a value for the second duty cycle when the PWM is deactivated.

8. The method as claimed in claim 1, wherein the change in the actual duty cycle can be activated or deactivated in accordance with the slope value at execution time.

9. The method as claimed in claim 1, wherein a second duty cycle threshold value of the PWM is existent that is designed such that actual duty cycles between this second duty cycle threshold value and continuous actuation are skipped when the actual duty cycle is changed.

10. The method as claimed in claim 1, wherein the first duty cycle threshold value and/or the second duty cycle threshold value are stipulated on the basis of the PWM frequency.

11. The method as claimed in claim 1, wherein a minimum value is defined for the actual duty cycle, said minimum value being stipulated on the basis of the PWM frequency and being less than or equal to the first duty cycle threshold value.

12. The method as claimed in claim 1, wherein the actual duty cycle in bits is changed on the basis of the bit significance per period of the PWM.

13. The method as claimed in claim 9, wherein the first duty cycle threshold value and/or the second duty cycle threshold value is changed at execution time.

14. The method as claimed in claim 9, wherein the first duty cycle threshold value and/or the second duty cycle threshold value is/are stored in at least one logic register and used for the provision of the actual duty cycle by the hardware logic unit.

15. An electronic circuit arrangement for performing the method as claimed in claim 1, wherein data are interchanged with a microcontroller that executes a computation via an SPI bus system, with a hardware module that actuates an electric pump motor in a motor vehicle brake system, wherein the hardware module comprises at least one hardware logic unit and at least one logic register, wherein at least one logic register is existent that stores a slope value of the duty cycle and/or a first duty cycle threshold value and/or a setpoint duty cycle of the PWM, and the hardware logic unit determines an actual duty cycle for actuating the electric motor by using the values in the logic register(s).

* * * * *